US008762940B2

(12) United States Patent
Grossman (10) Patent No.: US 8,762,940 B2
(45) Date of Patent: Jun. 24, 2014

(54) DRAG AND DROP UTILITIES

(75) Inventor: Mark Grossman, Palo Alto, CA (US)

(73) Assignee: ATI Technologies Inc., Markham, Ontario (CA)

( * ) Notice: Subject to any disclaimer, the term of this patent is extended or adjusted under 35 U.S.C. 154(b) by 1821 days.

(21) Appl. No.: 11/512,161

(22) Filed: Aug. 30, 2006

(65) Prior Publication Data

US 2008/0126966 A1    May 29, 2008

(51) Int. Cl.
*G06F 9/44*    (2006.01)

(52) U.S. Cl.
USPC .......................................................... 717/113

(58) Field of Classification Search
None
See application file for complete search history.

(56) References Cited

U.S. PATENT DOCUMENTS

| | | | | |
|---|---|---|---|---|
| 5,214,756 | A * | 5/1993 | Franklin et al. | 715/839 |
| 5,428,734 | A * | 6/1995 | Haynes et al. | 715/769 |
| 6,002,402 | A * | 12/1999 | Schacher | 715/810 |
| 6,182,278 | B1 * | 1/2001 | Hamada et al. | 717/107 |
| 6,263,255 | B1 * | 7/2001 | Tan et al. | 700/121 |
| 6,742,176 | B1 * | 5/2004 | Million et al. | 717/120 |
| 6,871,345 | B1 * | 3/2005 | Crow et al. | 717/175 |
| 6,950,935 | B1 * | 9/2005 | Allavarpu et al. | 713/168 |
| 6,996,832 | B2 * | 2/2006 | Gunduc et al. | 719/331 |
| 7,106,472 | B2 * | 9/2006 | Gomez et al. | 358/1.15 |
| 2004/0083465 | A1 * | 4/2004 | Zhang et al. | 717/143 |
| 2004/0123184 | A1 * | 6/2004 | Westberg | 714/38 |
| 2004/0249986 | A1 * | 12/2004 | Minowa et al. | 710/1 |
| 2005/0033794 | A1 * | 2/2005 | Aridor et al. | 709/200 |
| 2005/0066287 | A1 * | 3/2005 | Tattrie et al. | 715/769 |
| 2005/0157321 | A1 * | 7/2005 | Alacar | 358/1.13 |
| 2006/0149877 | A1 * | 7/2006 | Pearson | 710/260 |
| 2006/0167676 | A1 * | 7/2006 | Plumb | 704/6 |
| 2006/0277537 | A1 * | 12/2006 | Chan et al. | 717/168 |
| 2008/0033921 | A1 * | 2/2008 | Arrouye et al. | 707/3 |
| 2008/0141045 | A1 * | 6/2008 | Abiko et al. | 713/193 |
| 2011/0035229 | A1 * | 2/2011 | Colombo et al. | 705/1.1 |

OTHER PUBLICATIONS

Jaquier et al. Towards an improved framework for YaMoR: Simulation and real-time control. [online] (Jun. 21, 2005). Biologically Inspired Robotics Group, pp. 1-35. Retrieved From the Internet <http://birg.epfl.ch/webdav/site/birg/shared/bluetooth/downloads/report-final-summer.pdf>.*

(Continued)

*Primary Examiner* — Don Wong
*Assistant Examiner* — Hossain Morshed
(74) *Attorney, Agent, or Firm* — Sterne, Kessler, Goldstein & Fox P.L.L.C.

(57) ABSTRACT

The invention described herein includes a system, method, and computer program product for adding functionality to an application program. The invention includes a tool which can be used in conjunction with any of a plurality of application programs. The tool can be represented to a user by a tool icon on a desktop. After creating or opening a file or other object with an application program, the user can drag and drop a tool icon representing the tool into the application window. This allows the tool program to operate on the object. A windowing system event handler receives information from a user interface regarding the dragging and dropping of the tool icon. The fact that the tool icon has been dragged and dropped into the application window is reported by the windowing system event handler to a base module. The base module mediates communication between the tool program and the application program. This allows the tool program to operate on the object, which may have been previously locked by the application program. Once the object has been unlocked, the tool can then operate on the object.

17 Claims, 5 Drawing Sheets

(56) References Cited

OTHER PUBLICATIONS

Chatley et al. MagicBeans: a Platform for Deploying Plugin Components. [online] (May 3, 2004). ACM. Lecture Notes in Computer Science, vol. 3083/2004, pp. 97-112. Retrieved From the Internet <http://www.springerlink.com/content/12l34ctb8n8bufch/>.*

MacSripter BBS, Applescript Forums, chat line, http://bbs.applescript.net/viewtopic.php?pid=45438, Sep. 7, 2005, 4 pgs.

* cited by examiner

DRAG AND DROP UTILITIES

BACKGROUND OF THE INVENTION

1. Field of the Invention

The invention described herein relates to application programs and in particular relates to enhancing functionality of applications.

2. Related Art

A user of an application program may sometimes need to supplement the functionality of the application with additional capabilities. One way of accomplishing this is through the use of plug-in modules. A plug-in module can add menu items or other user interface features that represent additional options for manipulation of data. A standard protocol is typically used so that the application can discover and make use of a plug-in.

This approach is limited, however, in that a given plug-in is generally bound to a specific application. If functionality similar to that of the plug-in is desired in another application, the plug-in cannot be used for the latter application. That application would need its own plug-in. This arrangement limits the utility of a plug-in to a particular application.

This is true regardless of whether the user interface to the operating system is a graphical, windows-based interface or a command line interface. In either case, there is no way to invoke additional common functionality for multiple applications. In the case of a windows-based operating system, for example, the manipulation of data objects is generally easy and intuitive for a user. Data and data structures can be readily moved about. Files can be submitted to any of several applications for processing of the file, by selecting a graphic that represents a file, and moving it to or from a graphic that represents one of the applications. Such an application might be depicted as an opened window. Such movement of a file is generally termed "dragging and dropping" of the file, given that the relocation process involves moving (or "dragging") the file icon and placing it in a destination ("dropping"). Data can also be moved about easily, by selecting the data as it appears in a window associated with an application (e.g., highlighting text in a word processing application), and moving it to another window that may represent another application (e.g., pasting the text into a spreadsheet application).

But while data and files can be readily moved to any of several applications in a windows environment, functionality is not generally easy to select and move to applications. There is a need, therefore, for a system and method by which additional capability can be added to any of several applications, without being restricted to a single application.

SUMMARY OF THE INVENTION

The invention described herein includes a system, method, and computer program product for adding functionality to an application program. The invention includes a tool which can be used in conjunction with any of a plurality of application programs. The tool can be represented to a user by a tool icon on a desktop. After creating or opening a file or other object with an application program, the user can drag and drop a tool icon representing the tool into the application window. This allows the tool program to operate on the object. A windowing system event handler receives information from a user interface regarding the dragging and dropping of the tool icon. The fact that the tool icon has been dragged and dropped into the application window is reported by the windowing system event handler to a base module. The base module mediates communication between the tool program and the application program. This allows the tool program to operate on the object, which may have been previously locked by the application program. Once the object has been unlocked, the tool can then operate on the object.

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The invention described herein includes a system, method, and computer program product for adding functionality to an application program. The invention includes a tool which can be used in conjunction with any of a plurality of application programs. The tool can be represented to a user by a tool icon on a desktop. After creating or opening a file or other object with an application program, the user can drag and drop a tool icon representing the tool into the application window. This allows the tool program to operate on the object. A windowing system event handler receives information from a user interface regarding the dragging and dropping of the tool icon. The fact that the tool icon has been dragged and dropped into the application window is reported by the windowing system event handler to a base module. The base module mediates communication between the tool program and the application program. This allows the tool program to operate on the object, which may have been previously locked by the application program. Once the object has been unlocked, the tool can then operate on the object.

Figure 1:
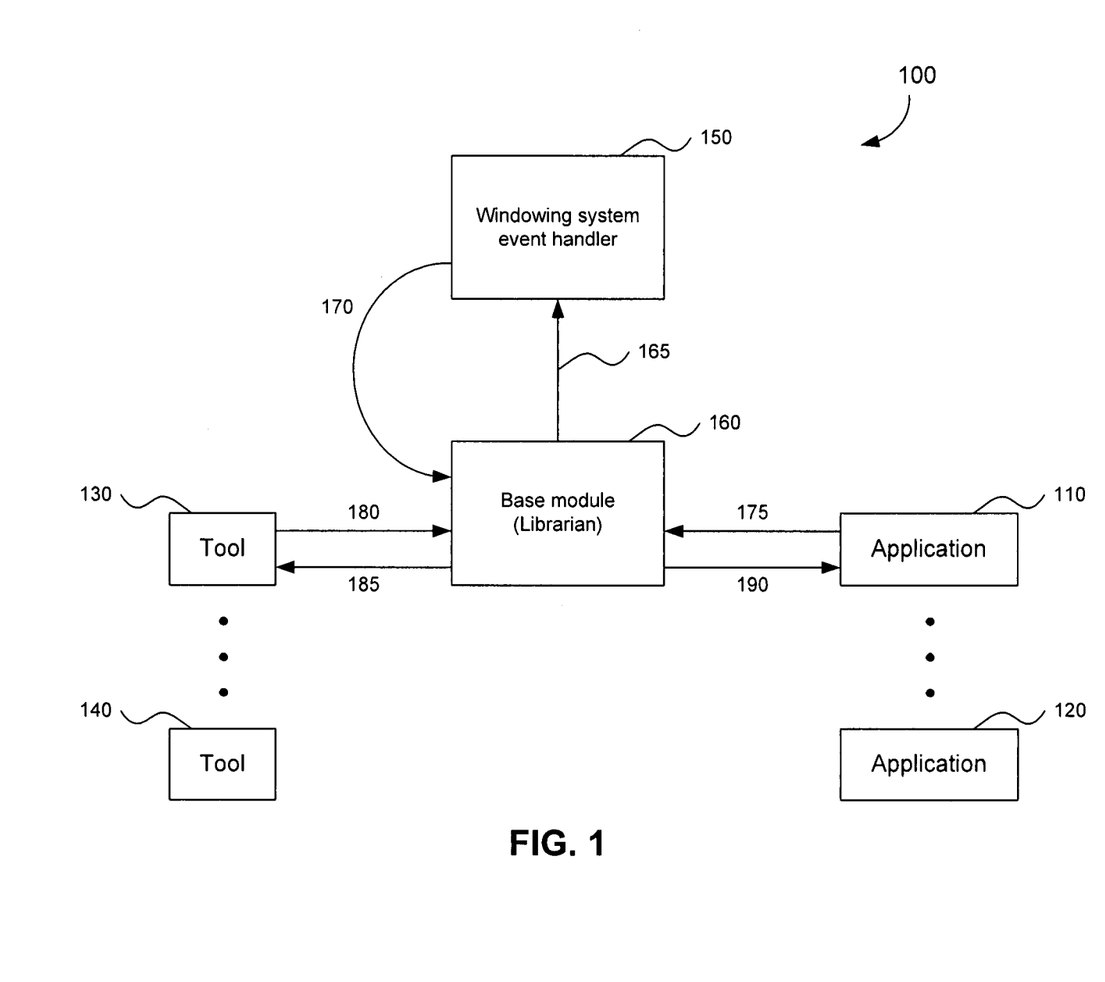
FIG. 1 is a block diagram illustrating the software components of an embodiment of the invention.

An embodiment of the invention is illustrated in FIG. 1. This illustration shows a set of software modules and their interactions. A set of application programs 110-120 is shown, along with a set of tool programs, 130-140. A tool can be used to supplement the functionality of one or more application programs. From the perspective of a user, a tool program is invoked via an icon that represents the tool program. In a windowing environment, the icon can be dragged and dropped into an application window that corresponds to the application program whose functionality is being supplemented. The communication between a tool and an application program is facilitated by a base module 160. This module may be viewed as a librarian module. Base module 160 represents a core set of methods for allowing application and tool programs to communicate. Module 160 keeps track of any semaphores used for each object exposed by an application, and otherwise makes sure that a tool program cannot access an application program's object (and vice versa) unless permitted.

It is through base module 160 that a tool determines whether an object (not shown) being manipulated by an application program can be accessed by the tool. Generally, a tool program can only access such an object (e.g., a file) if it is allowed to do so, i.e., if the object is "unlocked" for the tool. Likewise, a tool program may lock an object while manipulating it, thereby preventing access to the object by other programs. The object must then be unlocked before the application program can further manipulate the object. The information as to whether an object is locked or unlocked is conveyed between the tool program and the application program via the base module 160. The locking of an object is a restriction as to what entities can manipulate the object and/or how the object can be manipulated. If application 110 is working with a particular object, other applications or tools may be restricted from working on that object. With respect to those other applications and tool programs, the object is therefore said to be locked.

FIG. 1 also shows a window system event handler 150. The event handler 150 detects user actions in a user interface, such as the dragging and dropping of an icon in a windowing environment. If, for example, an icon corresponding to tool program 130 is dragged and dropped into an application window corresponding to application program 110, event handler 150 informs base module 160 of this event. Base module 160 will then know that it will be required to mediate communications between tool program 130 and application program 110, as will be described in greater detail below.

Generally, a module may have to make itself known to other modules in the system, to facilitate interaction with other modules. This identification process is referred to herein as "registration". Initially, base module 160 must register with windowing system event handler 150, via communication path 165. Event handler 150 then knows that base module 160 is present, and can therefore inform base module 160 of any drag and drop events pertaining to tool and application programs. Event handler 150 informs base module 160 of such events through communication path 170.

Further, if and when an application program either creates or otherwise accesses an object, the application program needs to register the object with base module 160 in an embodiment of the invention. In FIG. 1, application 110 registers an object with base module 160 through communication path 175. The registration of an object can be implemented in a manner exemplified by the following pseudocode:

```
textbox = new TextBox;
textbox.Location = new Point(40, 60);
textbox.Size = new Size(100, 50);
textbox.Text = "Some Text String";
Dropplet.Obj.Add(textbox);   # register the object
Dropplet.Obj.UpdateHandler(textbox, TextboxUpdate);
   # its handler
Sub TextboxUpdate (box) {
   Print "text is now" . box.Text;
}
```

As a result of this registration, base module 160 can subsequently be told by application program 110 whether the object is locked and therefore inaccessible by another process.

A tool program, such as tool 130, also registers itself with base module 160. In an embodiment of the invention, this registration of the tool program is performed at system boot up. In an alternative embodiment of the invention, the registration of the tool program with base module 160 is performed at a later time, but is done before the tool program can be invoked.

When a tool icon corresponding to tool program 130 is dragged and dropped by a user into a window corresponding to application program 110, the base module 160 is notified of this event by event handler 150. This notification is done via communication path 170, as described above. At this point, base module 160 informs tool program 130 of this event. Tool program 130 will then seek access to the object currently being manipulated by application program 110. As described above, base module 160 will know if the object is locked by application program 110, having been informed of this via communication path 175. If so, the object must be unlocked to allow access by tool program 130. The base module 160 is informed of the unlocking by application program 110, via communication path 175.

Note that in an embodiment of the invention, security considerations may come into play when determining whether or not application program 110 should unlock the object. For security reasons, it may be inadvisable for application program 110 to unlock an object just because the application has been requested to do so. Some tool programs or application programs may be authorized to access an object, while other programs may not. In this situation, a tool program requesting access to an object may need to authenticate itself to the application program. This authentication process can be based on any of a number of well known cryptographic techniques, as is well known in the art. By providing authentication, a requesting tool program is asserting that it is a trustworthy process and should be given access to the object.

In any event, assuming that tool program 130 is authorized to access the object currently being manipulated by application program 110, application program 110 unlocks the object, and this change in the object's status is conveyed to base module 160. Base module 160 then forwards this information to tool program 130, via communication path 185.

Tool program 130 may then lock the object and informs base module 160 of this, through communication path 180. Tool program 130 can then act on the object. When tool program 130 has completed its operation, it can unlock the object. The fact that the object is now unlocked is conveyed to base module 160 through communication path 180. The fact that the object is now unlocked is forwarded to application program 110 via communication path 190. The following is an example of the process of unlocking an object to allow an application program access:

while (!Dropplet.Obj.Trylock(textbox));
   # wait until lock obtained
textbox.Text="Updated Text String";
Dropplet.Obj.Unlock(textbox);

Note that in many operating systems, common classes of objects exist with published characteristics. This allows multiple tasks to understand and manipulate the objects. This simplifies the problem of allowing multiple programs (i.e., application programs and tool programs) to manipulate an object. For example, there are various classes of text commonly used, such as plain text, HTML, and XML. Likewise, there are a number of standard classes of image files, such as GIF and BMP. Similarly, three dimensional objects may take the form of a triangular mesh, or a scene graph, or some other standard representation.

Figure 2:
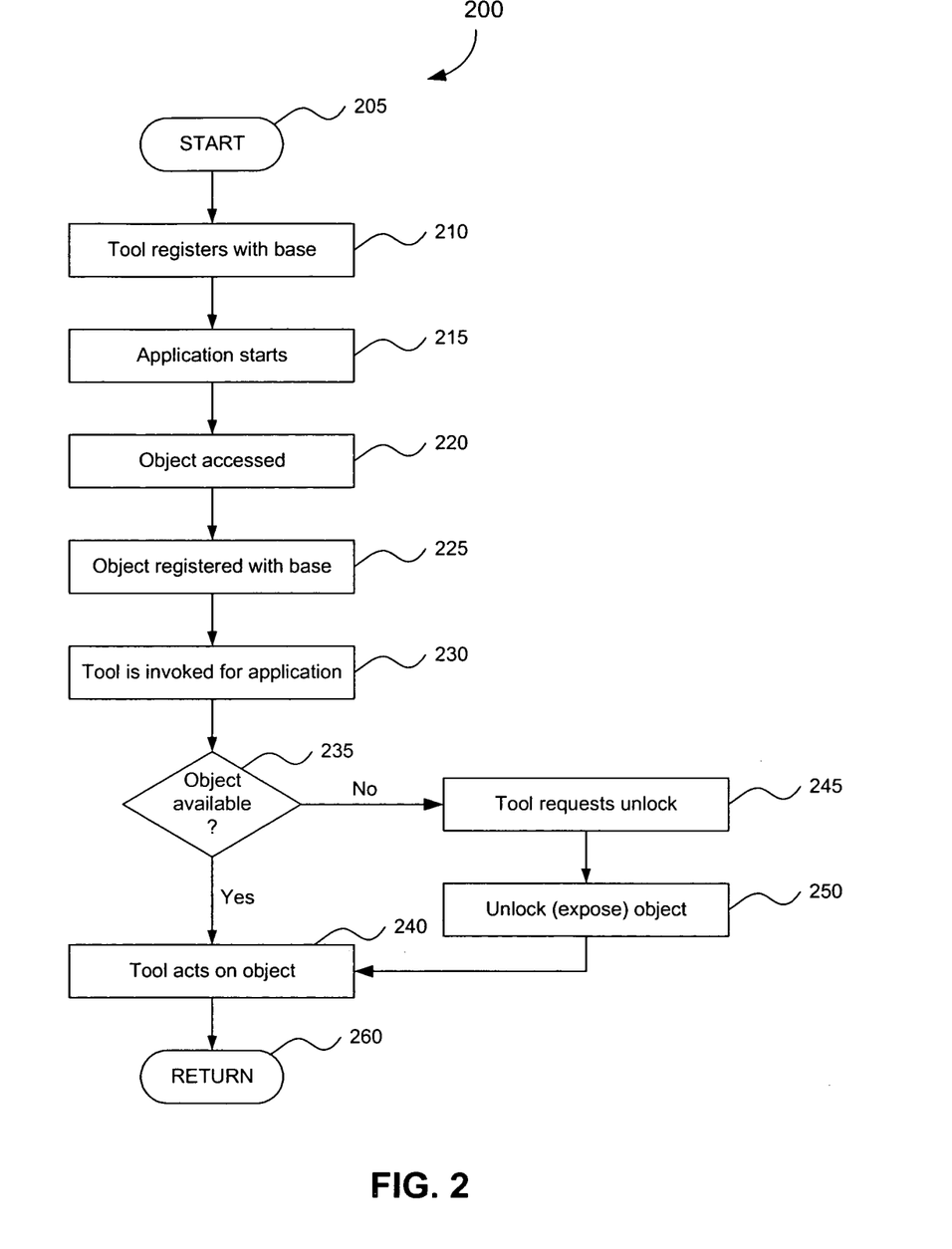
FIG. 2 is a process flowchart illustrating the overall processing of an embodiment of the invention.

The overall processing of an embodiment of the invention is illustrated in FIG. 2. The process begins at step 205. In step 210, a tool program registers with a base module. In step 215, an application program starts executing. In step 220, an object is accessed by the application program. The object may be a preexisting file, for example, or alternatively the application program may create the object in this step. In step 225, the object is registered with the base module. In step 230, the tool is invoked for use in conjunction with the application program. In a windows style environment, this can be done by dragging and dropping a tool icon, corresponding to the tool program, into a window that corresponds to the application program.

In step 235, the determination is made as to whether the object is available for manipulation by the tool program. As discussed above, the object may not be available, e.g., if the application program has locked the object. If the object is available, i.e., unlocked, then in step 240 the tool program acts on the object. If, in step 235, the object is found to be locked, then in step 245, the tool requests that the object be unlocked. In step 250, the object is unlocked by the application program. The tool program can then act on the object in step 240. The process concludes at step 260.

Figure 3:
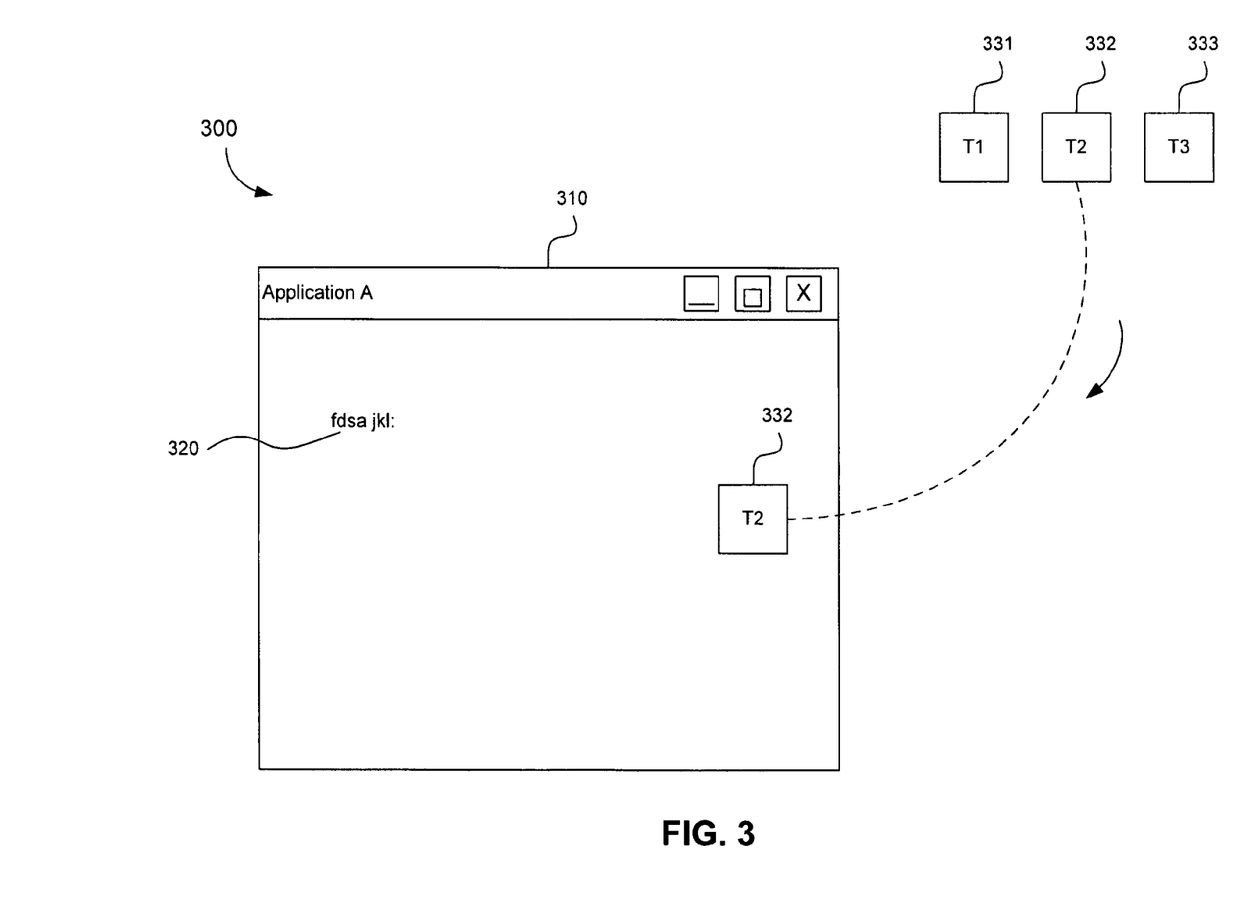
FIG. 3 is an example of how an embodiment of the invention may appear to a user.

The operation of the program from a user's perspective is illustrated in FIG. 3. Here, application A is working with an object 320. The object 320, in this example, is a text file. The object, and manipulations of the object by application A, are displayed in a window 310. The user also has available three tool programs, displayed to the user as tool icons 331, 332, and 333. If the user seeks to apply tool 332 to the object currently opened by application A in window 310, the user can click on icon 332, and drag it into window 310. The tool program represented by tool icon 332 may, for example, perform spell checking on object 320, manipulate the margins of object 320, or otherwise manipulate the object.

Note that that in the illustration of FIG. 3, application A may, for example, be a word processing program. There may be other applications that process text in a different manner for different purposes. These may include, for example, a spreadsheet program, or a presentation program such as Powerpoint. Tool icon 332 would likewise be able to manipulate objects being handled by such programs. By dragging and dropping tool icon 332 into a spreadsheet application program, for example, the tool associated with tool icon 332 could, say, spell check the text in a spreadsheet. Generally, a tool can be used in any of a plurality of application programs, according an embodiment of the invention.

Figure 4:
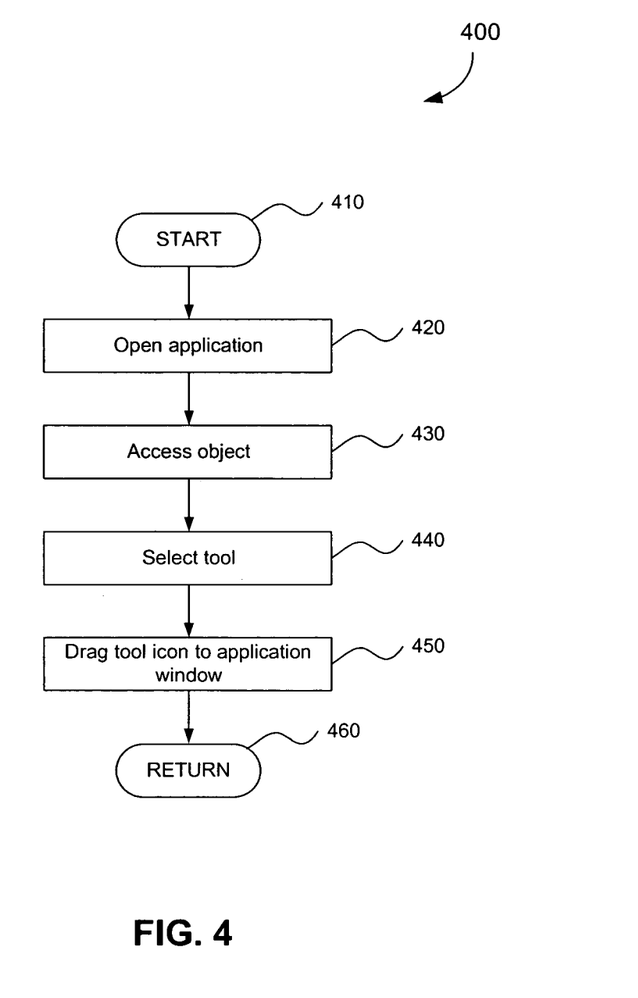
FIG. 4 is a flowchart illustrating the user's actions in using an embodiment of the invention.

FIG. 4 is a flowchart that illustrates the operation of the invention by a user. The process begins at step 410. In step 420, the user opens an application program. In step 430, an object is accessed by the application program. As described above, such access may entail creation of an object. In step 440, a tool is selected by the user. This can be done by selecting an icon that corresponds to the tool program. In step 450, the tool icon is dragged to the window corresponding to the opened application. The process concludes at step 460.

Figure 5:
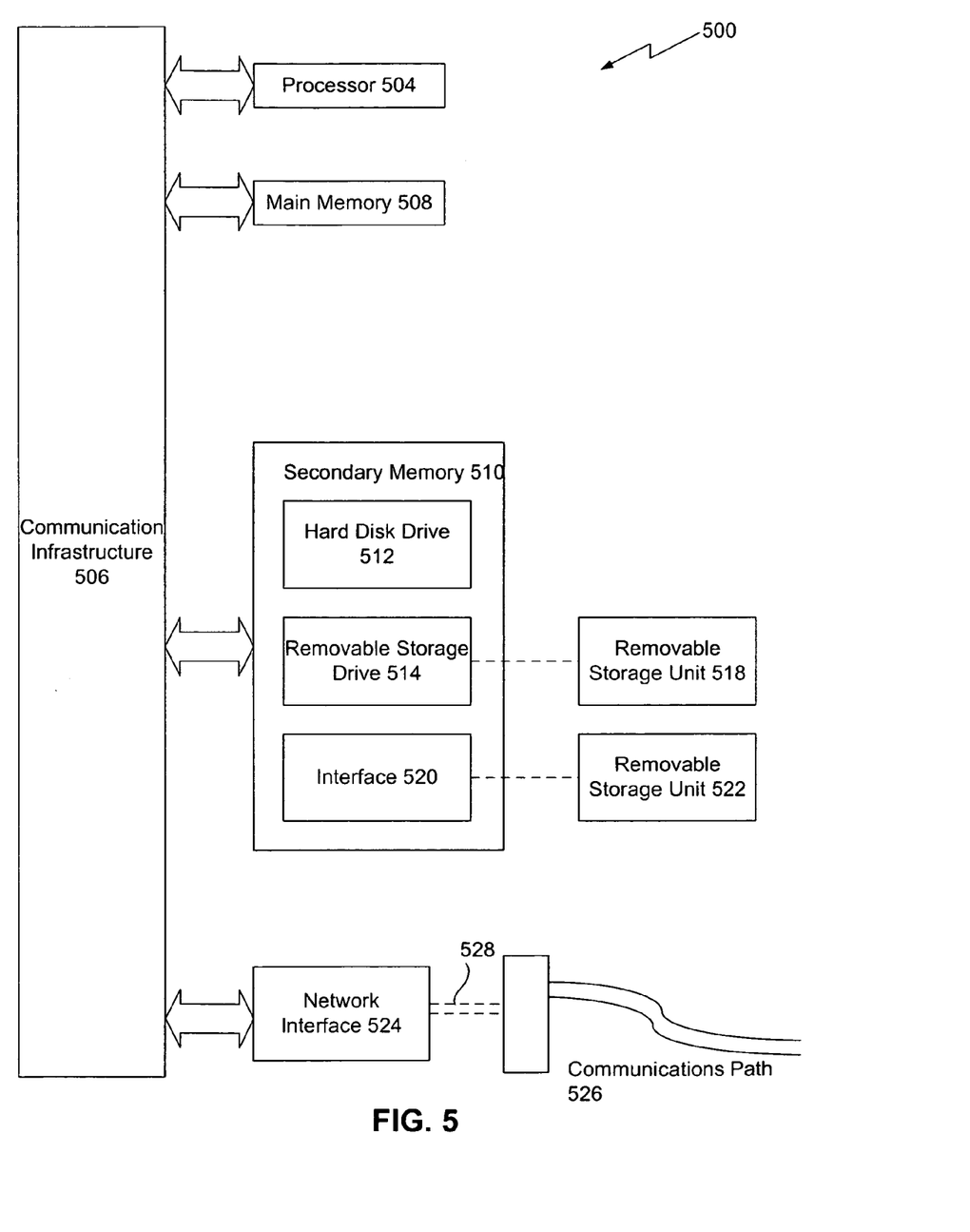
FIG. 5 is a block diagram illustrating a computer system in which the invention can operate, according to an embodiment thereof.

In an embodiment of the present invention, the system and components of the present invention described herein are implemented using well known computers, such as a computer 500 shown in FIG. 5. The computer 500 can be any commercially available and well known computer capable of performing the functions described herein, such as computers available from International Business Machines, Apple, Silicon Graphics Inc., Sun, HP, Dell, Compaq, Digital, Cray, etc.

The computer 500 includes one or more processors (also called central processing units, or CPUs), such as a processor 504. The processor 504 is connected to a communication bus 506. The computer 500 also includes a main or primary memory 508, such as random access memory (RAM). The primary memory 508 has stored therein control logic (computer software, not shown), and data.

The computer 500 also includes one or more secondary storage devices 510. The secondary storage devices 510 include, for example, a hard disk drive 512 and/or a removable storage device or drive 514. The removable storage drive 514 represents a floppy disk drive, a magnetic tape drive, a compact disk drive, an optical storage device, tape backup, etc.

The removable storage drive 514 interacts with a removable storage unit 518. The removable storage unit 518 includes a computer useable or readable storage medium having stored therein computer software (control logic) and/or data. Removable storage unit 518 represents a floppy disk, magnetic tape, compact disk, DVD, optical storage disk, or any other computer data storage device. The removable storage drive 514 reads from and/or writes to the removable storage unit 518 in a well known manner.

The computer 500 also includes input/output/display devices (not shown), such as monitors, keyboards, pointing devices, etc. An example of a monitor display of the invention in operation is provided in FIG. 3.

The computer 500 further includes a communication or network interface 524. The network interface 524 enables the computer 500 to communicate with remote devices. For example, the network interface 524 allows the computer 500 to communicate over communication networks or mediums 528 (representing a form of a computer useable or readable medium), such as LANs, WANs, the Internet, etc. The network interface 524 may interface with remote sites or networks via wired or wireless connections.

Control logic may be transmitted to and from the computer 500 via the communication medium 528. More particularly, the computer 500 may receive and transmit carrier waves (electromagnetic signals) modulated with control logic via the communication medium 528.

Any apparatus or manufacture comprising a computer useable or readable medium having control logic (software) stored therein is referred to herein as a computer program product or program storage device. This includes, but is not limited to, the computer 500, the main memory 508, the hard disk 512, and the removable storage unit 516. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A computer system comprising a processor configured to add functionality to an application program executing thereon, comprising:
    a windowing system event handler that receives information from a user interface indicating a dragging and dropping of a tool icon;
    a plurality of unique application programs, wherein one application program of said plurality is represented to a user by an application window into which said user drags and drops said tool icon;
    a tool program configured for manipulating an object file accessed by the one application program, the tool program being represented to said user by said tool icon wherein said tool program is invoked by any one of said plurality of unique application program, and a base module that mediates communication between said tool program and said one application program by precluding simultaneous manipulation of said object file by said tool program and said one application program.

2. The system of claim 1, wherein said object file is an instance of a common class of objects.

3. The system of claim 1, wherein functionality of any of said plurality of unique application programs is supplemented by having said tool icon dragged and dropped into a corresponding respective window.

4. The system of claim 1, wherein said base module is notified by said windowing system event handler of said tool icon being dragged and dropped into said application window.

5. The system of claim 4, wherein said base module is informed by said one application program as to whether said object file is locked or unlocked, such that said tool program accesses said object file if said object file is unlocked.

6. The system of claim 4, wherein said base module is informed by said tool program as to whether said object file is locked or unlocked, such that said one application program accesses said object file if said object file is unlocked.

7. The system of claim 1, wherein said one application program registers said object file with said base module upon access or creating said object file.

8. The system of claim 1, wherein said tool program registers itself with said base module prior to invocation by said user.

9. The system of claim 1, wherein said tool program operates on said object file only after being authenticated.

10. A computer-implemented method of adding functionality to an application program, comprising:
    registering a tool program with a base module, wherein the tool program is represented by a tool icon;
    registering an object file with the base module, wherein the object file has been accessed by one of a plurality of unique application programs;
    dragging and dropping the tool icon on the one application program, wherein a window system event handler is informed about the dragging and dropping;
    invoking the tool program to manipulate the object file accessed by the one application program;
    mediating, using the base module, communication between the tool program and the one application program by precluding simultaneous manipulation of said object file by said tool program and said one application program; and
    manipulating the object file by the tool program, wherein said tool program is invocable by any one of the plurality of unique application programs.

11. The method of claim 10, further comprising:
    determining, using the base module, if the object file is available to the tool program and, if not, unlocking the object file, performed before manipulating the object file.

12. The method of claim 10, further comprising:
    authenticating, using the base module, the tool program, performed before manipulating the object file.

13. The method of claim 10, wherein the invoking the tool program is performed by a user in a windowing environment by dragging and dropping the tool icon into a window associated with the one application program.

14. The method of claim 10, wherein the object file accessed by the one application program comprises the object file that has been created by the one application program.

15. A computer program product comprising a non-transitory computer usable medium having control logic stored therein for causing a computer to add functionality to an application program, the control logic comprising:
    first computer readable program code means for causing a computer to register a tool program with a base module, wherein the tool program is represented by a tool icon;
    second computer readable program code means for causing the computer to register an object file with the base module, wherein the object file has been accessed by one of a plurality of unique application programs;
    third computer readable program code means for causing the computer to drag and drop the tool icon on the one application program, wherein a window system event handler is informed about the dragging and dropping;
    fourth computer readable program code means for causing the computer to invoke the tool program to manipulate the object file accessed by the one application program;
    fifth computer readable program code means for causing the computer to mediate, using the base modules, communication between the tool program and the one application program by precluding simultaneous manipulation of said object file by said tool program and said one application program; and
    sixth computer readable program code means for causing the computer to manipulate the object file, in a manner defined by the tool program, wherein said tool program is invocable by any one of the plurality of unique application programs.

16. The computer program product of claim 15, the control logic further comprising:
    seventh computer readable program code means for causing the computer to determine if the object file is available to the tool program, and, if not, unlocking the object file.

17. The computer program product of claim 15, the control logic further comprising:
    seventh computer readable program code means for causing the computer to authenticate the tool program.

* * * * *